(12) United States Patent
Finnerty et al.

(10) Patent No.: US 6,998,187 B2
(45) Date of Patent: Feb. 14, 2006

(54) SOLID OXIDE FUEL CELLS WITH NOVEL INTERNAL GEOMETRY

(75) Inventors: Caine Finnerty, Buffalo, NY (US); David Coimbra, Buffalo, NY (US)

(73) Assignee: Nanodynamics, Inc., Buffalo, NY (US)

( * ) Notice: Subject to any disclaimer, the term of this patent is extended or adjusted under 35 U.S.C. 154(b) by 0 days.

(21) Appl. No.: 10/910,026

(22) Filed: Aug. 3, 2004
(Under 37 CFR 1.47)

(65) Prior Publication Data
US 2005/0042490 A1    Feb. 24, 2005

Related U.S. Application Data

(60) Provisional application No. 60/493,409, filed on Aug. 7, 2003.

(51) Int. Cl.
*H01M 8/10* (2006.01)
*H01M 4/58* (2006.01)

(52) U.S. Cl. ...................... 429/31; 429/218.1
(58) Field of Classification Search .............. 429/34, 429/40, 44, 45, 33
See application file for complete search history.

(56) References Cited

U.S. PATENT DOCUMENTS

| | | | | |
|---|---|---|---|---|
| 5,103,871 A | * | 4/1992 | Misawa et al. | 138/148 |
| 5,273,839 A | * | 12/1993 | Ishihara et al. | 429/34 |
| 6,183,609 B1 | * | 2/2001 | Kawasaki et al. | 204/252 |
| 6,436,565 B1 | * | 8/2002 | Song et al. | 429/31 |
| 6,692,855 B1 | * | 2/2004 | Aizawa et al. | 429/30 |
| 2002/0028367 A1 | * | 3/2002 | Sammes et al. | 429/31 |

FOREIGN PATENT DOCUMENTS

WO    WO99/54946    * 10/1999

OTHER PUBLICATIONS www.fuelcellmaterial.com/gdc updated Apr. 10, 2003.*
Blomen, L. and Mugerwa, eds. Fuel Cell Systems. Plenum Pres. New York. 1993. pp. 105-108, 473.*
EG&G Services, Parsons, Inc., SAIC. Fuel Cell Handbook, Fifth Edition. US Department of Energy. 2000. Chapter 8.*

* cited by examiner

*Primary Examiner*—Patrick Joseph Ryan
*Assistant Examiner*—Melissa Austin
(74) *Attorney, Agent, or Firm*—Simpson & Simpson, PLLC

(57) ABSTRACT

Fuel electrode-anode supported type solid oxide fuel cells (SOFC) comprise novel fuel electrode design with improved mechanical and electrochemical properties. The novel supporting anodes comprise a plurality of internal longitudinal elevations or bosses projecting inwardly into the central bore of the tubular body for structural reinforcement of the entire cell, increasing electrode surface area, optimizing the anode electronic conductivity, and facilitating the mounting of the cell into a SOFC assembly system (e.g., cell stack). The SOFCs of the invention contemplate a range of tubular configurations, including cylindrical and polygonal shapes having at least three surfaces. Low-cost manufacturing routes are also disclosed, whereby the protruding bosses in the anode support do not require additional processing steps compared to conventional forming techniques.

36 Claims, 11 Drawing Sheets

SOLID OXIDE FUEL CELLS WITH NOVEL INTERNAL GEOMETRY

CROSS-REFERENCE TO RELATED APPLICATION

This application claims the benefit of U.S. Provisional Application No. 60/493,409, filed Aug. 7, 2003.

TECHNICAL FIELD

The present invention relates generally to fuel cells, and more specifically, to tubular solid oxide fuel cells (SOFC) with improved anodes, and methods of manufacture, wherein the anodes enhance the physical and electrochemical properties of the cells through a unique internal geometry system for upgraded mechanical support, durability and cell performance.

BACKGROUND OF THE INVENTION

Several different solid oxide fuel cell structural designs have been developed, including tubular, planar and monolithic designs, all of which are documented in the technical literature (see, for example, Q. M. Nguyen et al., "Science and Technology of Ceramic Fuel Cells", Elsevier Science, January 1995). The tubular SOFC design originated from sealing problems associated with planar fuel cell stacks (see G. Hoogers, "Fuel Cell Technology Handbook", CRC Press, August 2002). Numerous patents have issued to Siemens Westinghouse Power Corp., Orlando, Fla., disclosing the so-called air electrode supported (AES) technology (see, for example, U.S. Pat. No. 5,916,700 to Ruka, et al.; U.S. Pat. No. 5,993,985 to Borglum, and U.S. Pat. No. 6,379,485 also to Borglum).

Notwithstanding noteworthy technical achievements in the field of tubular SOFC, air electrode-supported tubular fuel cells still suffer from several disadvantages. For one, air electrode materials, such as lanthanum, strontium, manganite, etc., are costly often making the technology economically unattractive. In addition, air electrodes are made of ceramic materials and their mechanical strength and durability is often less than that of fuel electrodes made of cermets (i.e. ceramic and metal composites).

Fuel electrode-supported (FES) tubular SOFC have attracted new attention in the field in view of some improved economics (see U.S. Pat. No. 6,436,565 to Song, et al).

While AES and FES tubular designs have been modified structurally with both open ends and closed at one end few significant improvements have been made in the basic tubular configuration suggesting modifications to the internal structural features of tubular SOFC over conventional cylindrical configurations, as means for enhancing both the structural integrity and performance characteristics of this type of cell.

Accordingly, there is need for improved anodes for tubular SOFCs for enhancing structural support, durability and increasing surface area for optimizing electronic conductivity of the cell.

SUMMARY OF THE INVENTION

It is therefore one principal object of the present invention to provide SOFCs with anodes having novel supportive construction. The geometry of the supporting anodes impart enhanced physical, thermal and electrical properties to the cell, and provide more attractive economics.

It is yet a further principal object of the invention to provide a method of manufacturing the improved tubular supporting anodes and SOFCs comprising the same with minimum processing steps.

The geometry of the novel anode layer comprises at least one, and more preferably, a multiplicity of longitudinal protrusions in the form of internal elevations or bosses (and grooves therebetween) projecting inwardly from the inner surface or i.d. of the anodic layer to the central opening or bore of the tubular body. Generally, the elevations or bosses may run parallel or coaxially with the longitudinal axis of the tubular body, and alternatively, may, for example, wind in a general helical pattern through the central bore without contacting other elevations or bosses or engaging other sectors of the tubular anodic surface. This "bossed" or "supporting anode" imparts improved mechanical reliability, durability and increased active cell area, whilst electrochemical performance is enhanced through minimized electrical resistances. The invention may also enhance fuel flow characteristics in the cell, as the internal protrusions may increase mixing by leading to turbulent or eddy mixing, for example. Thus, one principal object of the invention is to provide SOFCs with supporting anodes for the cells comprising a tubular body defining a central bore, wherein the tubular body includes supporting means protruding into the central bore for structurally reinforcing the entire fuel cell. Preferably, the supporting means protruding into the central bore is integral with the tubular anode body.

For purposes of this invention, such expressions as "tubular" or "tubular body", or variations thereof, as appearing in the specification and claims are intended to include fuel cells principally with circular or rounded walls, e.g., cylindrical shapes, however, the present invention is intended to also include tubular bodies that are polygonal geometric configurations having at least three sides, e.g., triangular tubes, rectangular/square tubes, hexagonal tubes, and variations thereof, such as three sided triangular-like tubes, wherein the vertices, for example, are rounded, and so on. Thus, while the SOFCs of the invention are illustrated mainly with cylindrical tubular bodies, it is to be understood this is intended for purposes of convenience only, and is not intended to be limiting or exclusionary of other geometric configurations, like those mentioned hereinabove.

Tubular SOFCs are considered to suffer from potential loses due to their geometry. It is noteworthy, the novel bossed structural features of the supporting anodes provide a preferential "low resistance" route for electron transfer, so as to minimize these losses.

A still further object of the invention is to provide improved tubular SOFCs having supporting anodes with novel geometric features which not only provide enhanced structural integrity, thermal and electrical properties, but because of their unique geometry also facilitate assembly of SOFC stack manifolding systems, whereby the anodic bossed elevations perform as guides in positioning fuel injectors, ensuring that gas channels remain open on either side of the injector.

Accordingly, the present invention relating to improved SOFCs with novel tubular anodic supports comprise a fuel electrode, and more specifically, a fuel electrode with interior anodic structures having suitable elevations extending inwardly into the central bore from the inner surface or ring of the tubular structure with intermediate grooves or depressions between the elevations for enhanced structural reinforcement of the SOFCs. Like the tubular SOFCs with which they will be employed, the supporting anodes of the invention can be either open at both ends, or closed at one end. The anodic supportive structure is a relatively thick walled, generally noncircular tubular bore by virtue of the protruding boss structures. Thus, the unique geometry of the anode imparts both rigidity and strength to the entire fuel cell.

Compositionally, the supporting fuel electrodes of the invention may be comprised of a transition metal (e.g., Ni) and a ceramic material (e.g., stabilized-zirconia, doped-ceria or other suitable electrolyte material) i.e., cermet.

As previously discussed, the major thrust of the invention relates to a novel anode design transforming the geometry of the electrode, so it becomes more physically supportive of the entire fuel cell structure. The bore of the fuel electrodes comprise an anodic ring configured into a tubular, but noncircular internal walled structure having at least one, and more preferably, a plurality of continuous longitudinal elevations or bosses, preferably symmetrically spaced and running coaxially with the longitudinal axis of the tubular body. The bosses preferably run the length of the tubular body, but may also run only part of the length of the tubular electrode body. Thus, by introducing longitudinal elevations or bosses (defining grooves therebetween) along the internal wall of the tubular structure, several advantages arise:

greater mechanical strength through added thickness or surface area to the fuel electrode transforming the anode into a highly supportive structure for the fuel cell. Preferably, the internal bosses are arranged symmetrically, so they are spaced equidistant from one another around the internal ring, further structurally reinforcing the entire tubular SOFC;

greater electrical conductive surface area is produced within the cell;

greater electrochemical output is achieved through enhanced electronic conductivity of the anode support;

improved efficiency in fuel cell assembly, i.e., ease of handling and mounting into a fuel cell stack is achieved wherein the grooves between the elevations perform as guides for positioning and securing fuel injectors. This reduces or eliminates breakage and leakage problems encountered with conventional circular tubes.

It will be recognized by those skilled in the art, the geometric configuration of the internal protruding bosses/elevations of the supporting anodes of the invention is practically unlimited. Representative elevations can include such shapes as conical, rectangular, square, rounded or semi-circular, to name but a few. Generally, their numbers and dimensions are tailored to the fuel injector design subsequently introduced during SOFC stack assembly.

The present invention also relates to improved methods of manufacturing the supporting anodes.

Methods of manufacture of the supporting anodes are directly related to the fuel electrode mixture composition. Useful extrusion techniques are those generally associated with extrusion of plastic masses. They provide improved economics in manufacturing the supporting anode with internal bosses, especially those running the entire length of the tubular body. Casting and pressing techniques are preferred for manufacturing more complex internal shapes, whereby the internal anode bosses are non-continuous or shorter in length relative to the entire length of the anode support tube.

Further improvement to the electrochemical properties of the fuel cell may be achieved by introducing artificial pore formers in the fuel electrode mixture, in order to optimize the catalytic activity and limit mass transfer issues.

From the forgoing disclosure and the following more detailed description, it will be apparent to those skilled in the art that the present invention provides a significant advance in tubular fuel cell technology, and more specifically, tubular SOFC technology. Specially significant in this regard is the potential the invention affords for more economic, high current density fuel cells produced at lower cost, whilst improving mechanical reliability. Additional features and advantages will be better understood in view of the more detailed description below.

BRIEF DESCRIPTION OF THE DRAWINGS

The nature and mode of operation of the present invention will now be more fully described in the following detailed description of the invention taken with the accompanying drawing figures, in which.

DESCRIPTION OF THE PREFERRED EMBODIMENTS

Figure 1:
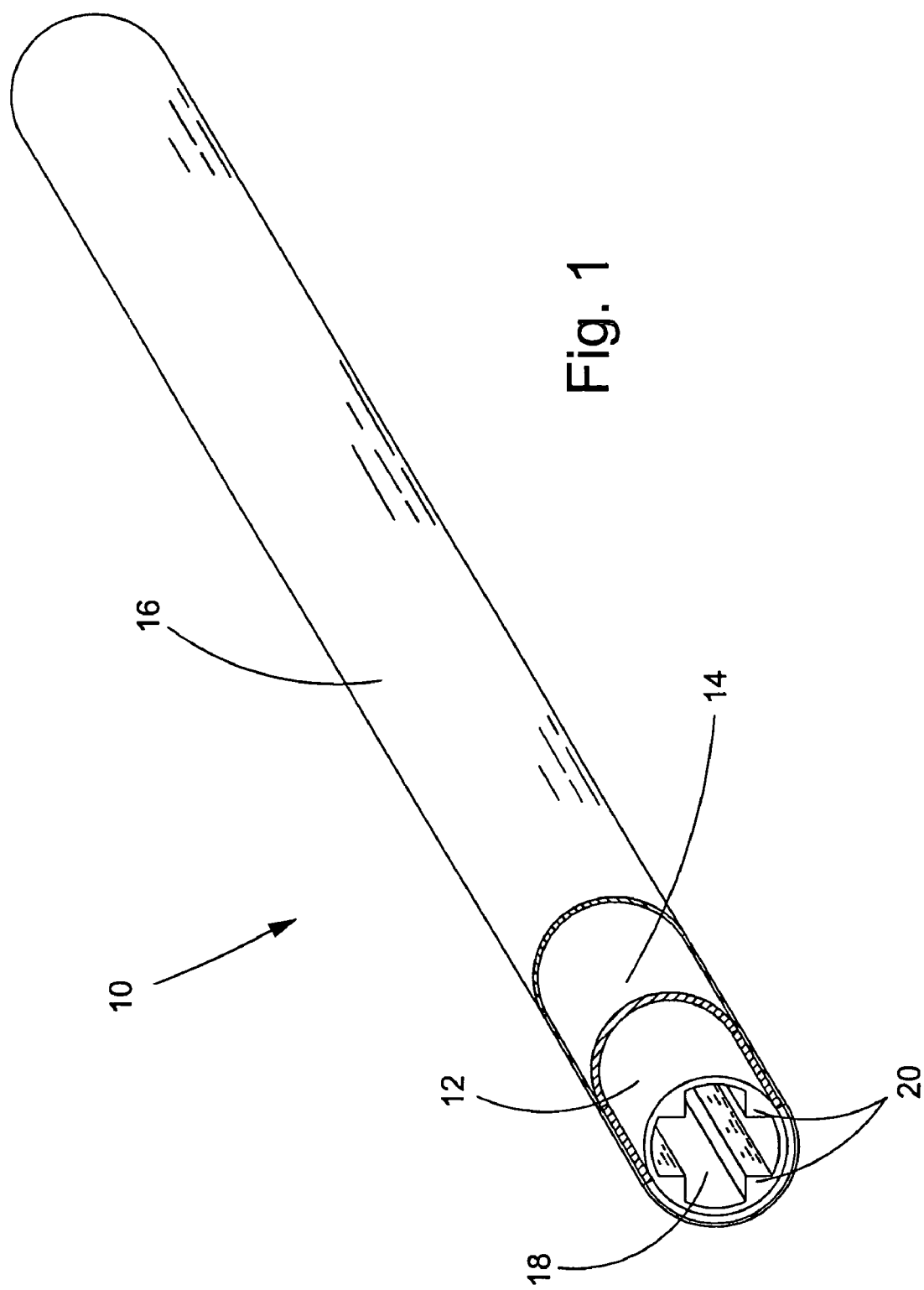
FIG. 1 is an isometric view of a tubular SOFC containing the supporting anode of the invention with portions removed to illustrate ring/layers of the cell, including the electrolyte and cathode portions of the cell.

Turning first to FIG. 1, a general view of SOFC 10 of the invention is provided as a cylindrical shaped tubular body modified to best illustrate the internal anodic ring 12, intermediate electrolyte 14 and exterior cathode ring 16. The anode 12 defines an inner bore 18 with multiple elevations 20 as projections from the inner wall of the anode into the bore.

Figure 2:
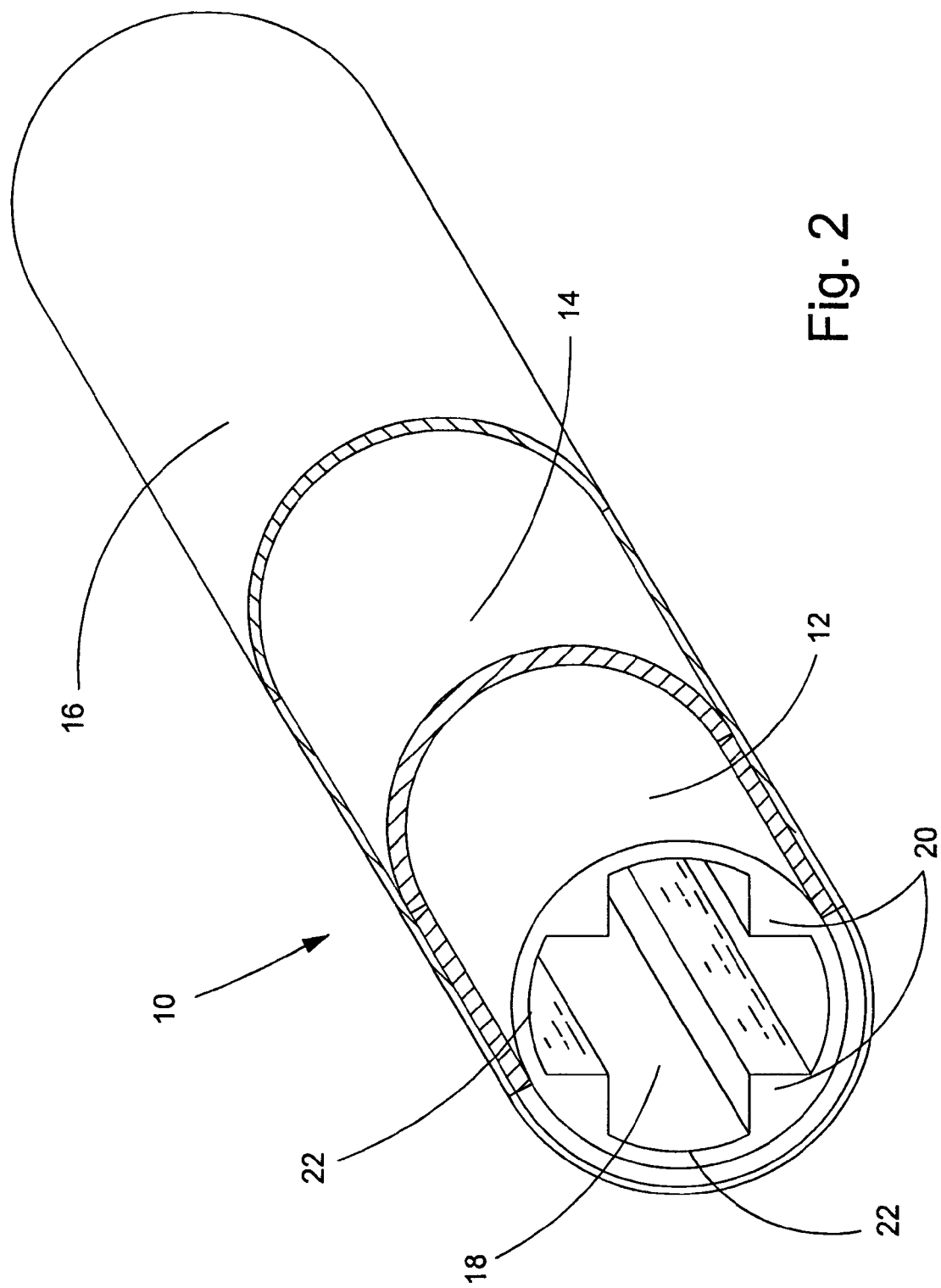
FIG. 2 is an enlarged isometric view of the tubular SOFC of FIG. 1 showing in greater detail the structural features of the invention including reinforcements consisting of four continuous longitudinal rounded grooves spaced between conically shaped bosses or elevations as projections on the internal anodic ring of the cell (full length)

FIG. 2, an enlarged view of the fuel cell of FIG. 1, best illustrates anode support 12 of the invention where four symmetrically shaped and positioned, conical bosses 20 run coaxially the full length of the tubular SOFC 10 with oval grooves 22 positioned in between. Bosses 20, which provide added surface area and strength to the fuel cell, are shown to be integral with the anode ring 12.

Figure 3:
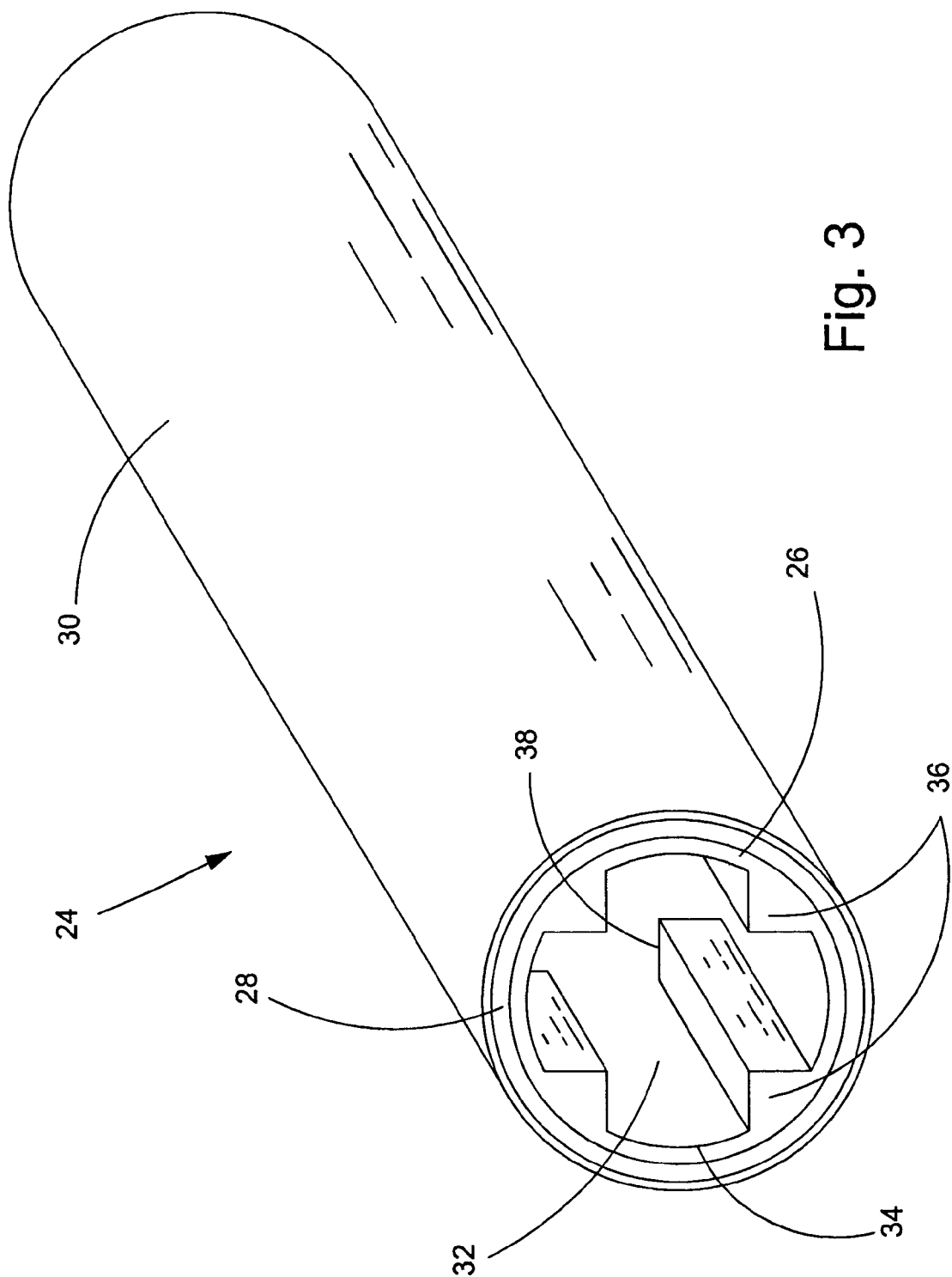
FIG. 3 is an isometric view of a further embodiment of an SOFC of the invention comprising a supporting anode like that illustrated by FIG. 2, but modified wherein the internal conically shaped bosses run only a partial length of the tubular cell on the internal anodic ring (short length)

FIG. 3, which illustrates some of the same structural features as FIG. 2, provides an alternative embodiment of a generally cylindrical shaped SOFC 24 of the invention, including supporting anode 26, intermediate electrolyte 28 and exterior cathode 30. Anode 26 defines an interior bore 32 with oval grooves 34 positioned between conical shaped elevations/bosses 36. Fuel cell 24 also features shortened elevations 38 which do not run the full length of the cell, but are shorter than the overall length of the tubular body.

Figure 4:
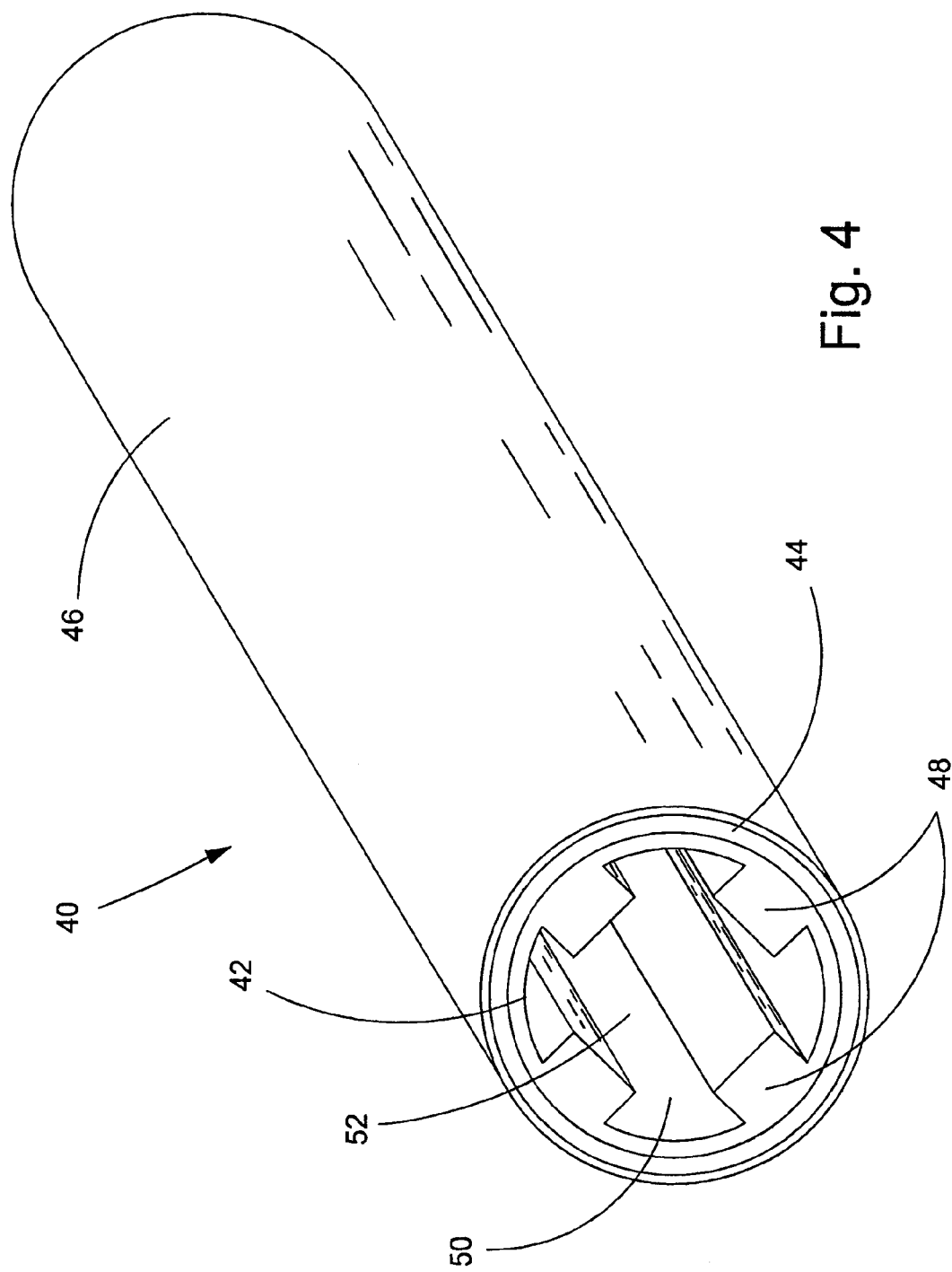
FIG. 4 is an isometric view of a further embodiment of an SOFC of the invention comprising a supportive anode ring with a multiplicity of symmetrically spaced, longitudinally continuous, rectangular shaped supporting elevations on the internal ring of the electrode defining spaced grooves therebetween.

FIG. 4 is yet a further alternative embodiment of the invention illustrating cylindrical SOFC 40 comprising supporting interior anode ring 42, intermediate solid electrolyte ring 44 and outer cathode 46. The interior anodic ring 42 comprises a plurality of uniformly spaced longitudinal elevations 48 as integral elements of the anodic ring structure positioned between arcs or grooves 50. Elevations 48 are rectangular or generally square shaped configuration positioned inwardly to the fuel cell bore 52.

Figure 5:
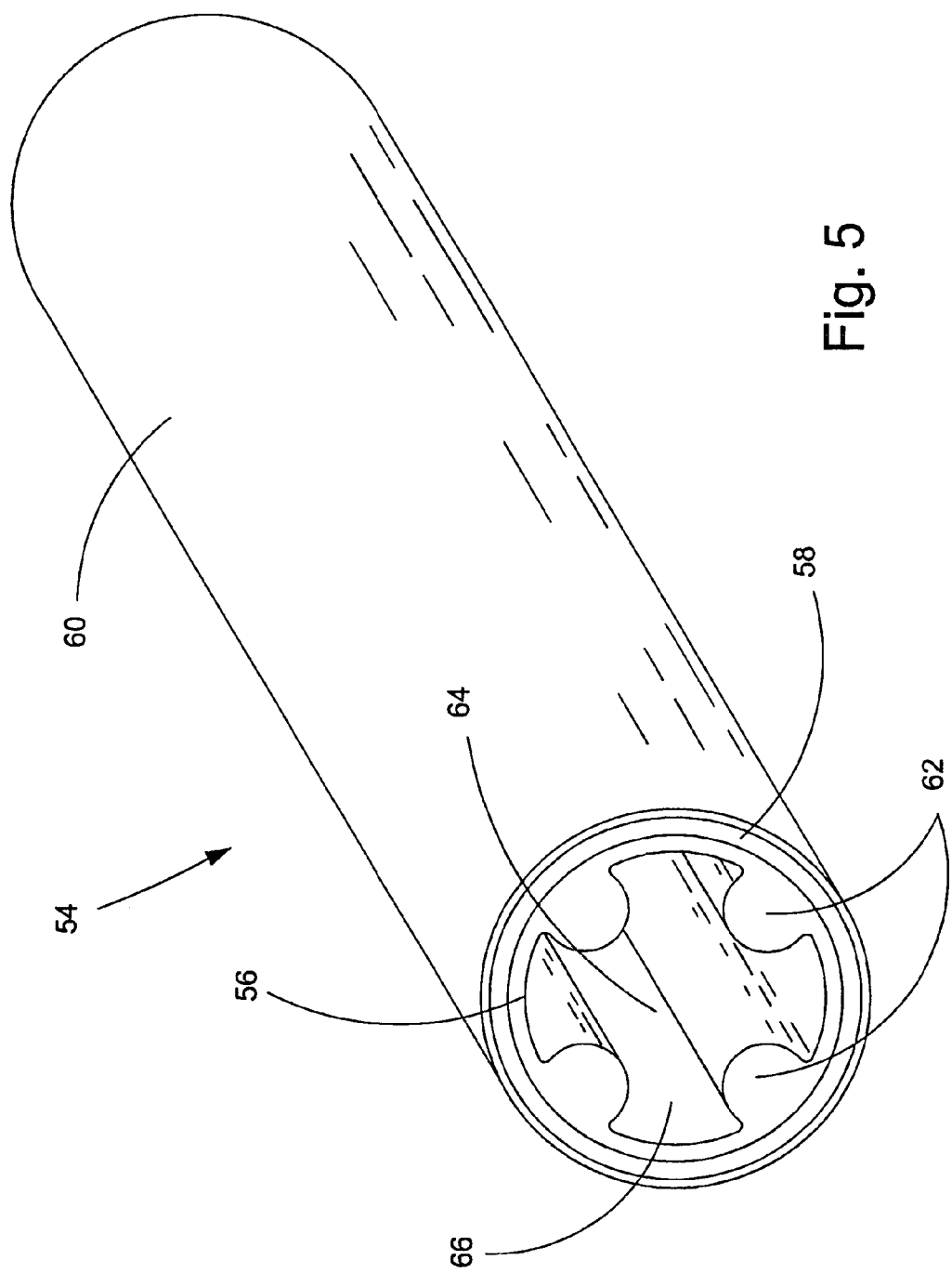
FIG. 5 is an isometric view of yet a further embodiment of the SOFC's of the invention comprising a supportive anode ring featuring a multiplicity of supporting elements as uniformly spaced, rounded elevations protruding into the bore of the tubular body and running the length of the cylindrical cell with continuous rounded grooves on the internal ring therebetween (full length)

FIG. 5 illustrates a further embodiment of the anode reinforced SOFCs of the invention with tubular fuel cell 54, also having a cylindrical configuration. The reinforced SOFC 54 comprises an inner supporting anode ring 56, intermediate solid electrolyte 58 and exterior cathode ring 60, wherein the interior elevations of the anode comprise rounded, uniformly spaced bosses 62 as reinforcing protrusions running longitudinally through cell bore 64, either partially or fully for the length of the cell. Preferably, the elevations 62 are spaced symmetrically between inner rounded areas 66 of the interior wall of the supporting anode.

Figure 6:
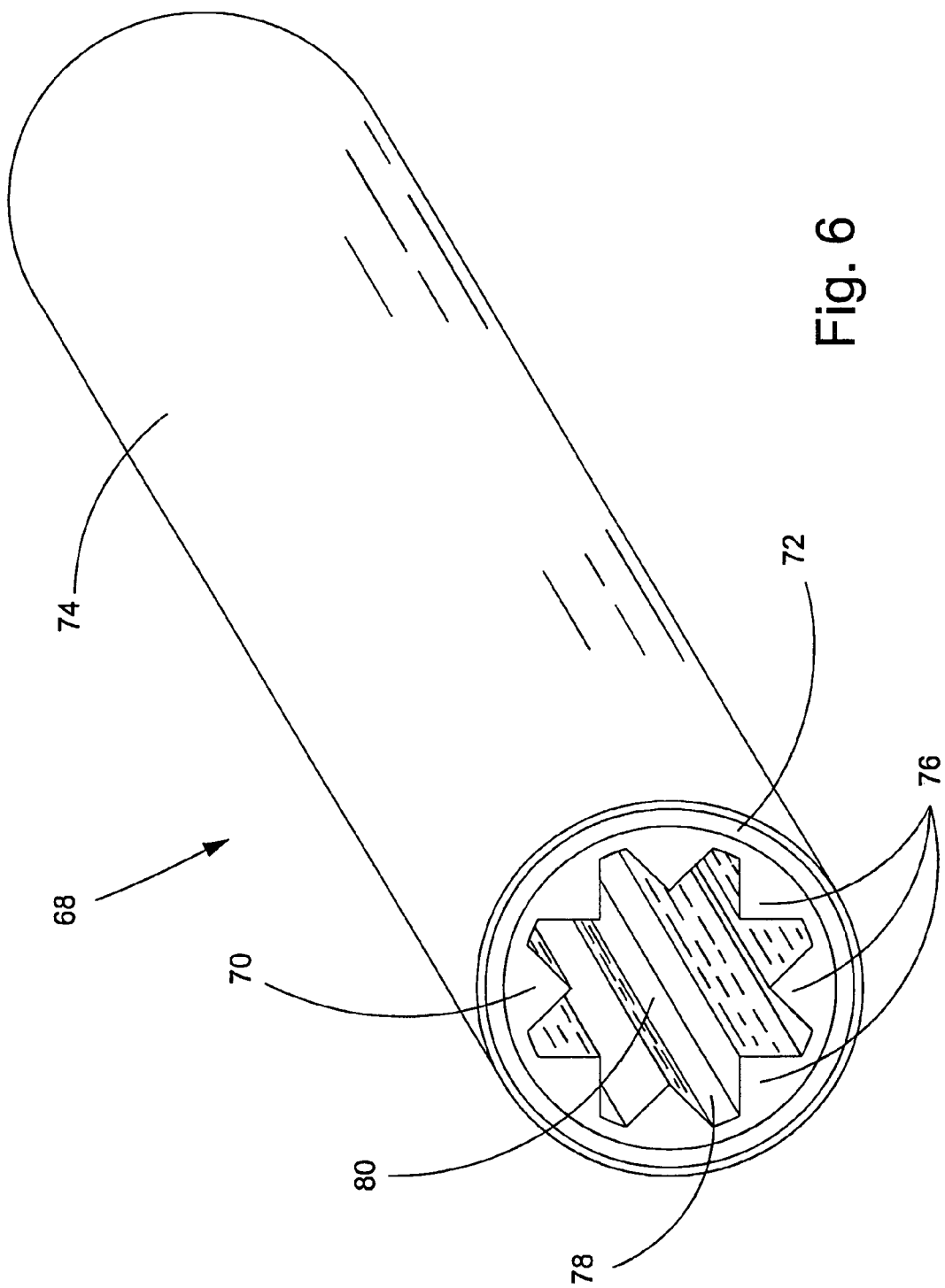
FIG. 6 is also an isometric view of a further embodiment of the novel solid oxide fuel cells of the invention comprising supporting anodes featuring a multiplicity of eight conically shaped supportive bosses as inward elevations off the internal annular ring running the length of the tubular cell and forming continuous grooves therebetween (full length)

FIG. 6 illustrates a further embodiment of a cylindrical shaped SOFC 68 of the invention having a supporting anode 70, an intermediate solid electrolyte ring 72 and an outer cathode 74. The supporting anode 70 features an internal geometry comprising eight full-length generally conically shaped elevations 76 protruding into central bore 80 with slightly rounded grooves 78 in between.

Figure 7:
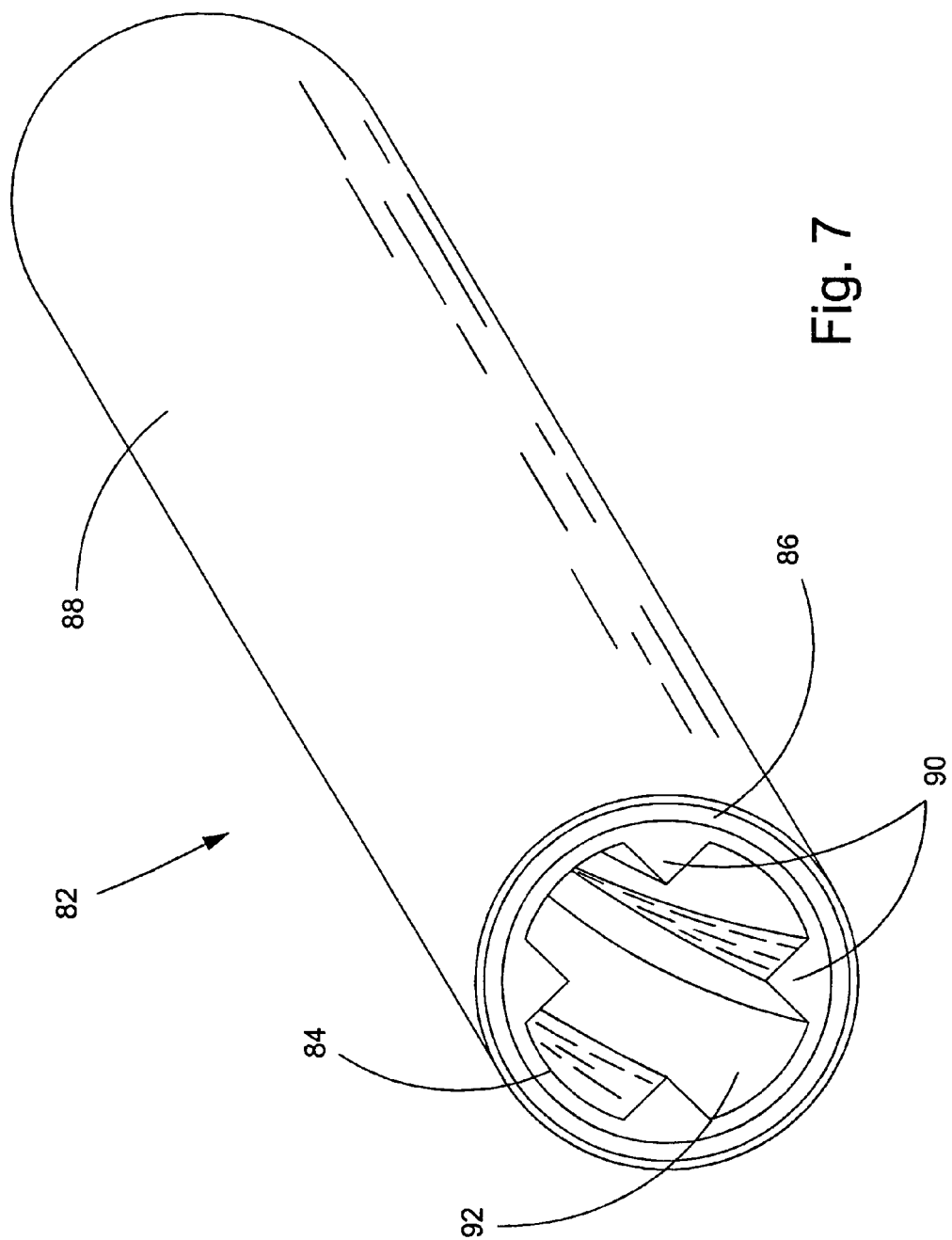
FIG. 7 is an isometric view of yet a further embodiment of a SOFC of the invention comprising supporting anodes featuring internal elevations in a helical or spiral configuration.

FIG. 7 illustrates a further cylindrical embodiment 82 of the tubular SOFC of the invention with a supporting anode 84 having novel internal geometry, including an electrolyte layer 86 and cathode ring 88, wherein the elevations 90 of supporting anode 84 are continuous, and follow a helical route along the length of the support tube between rounded areas 92.

Figure 8:
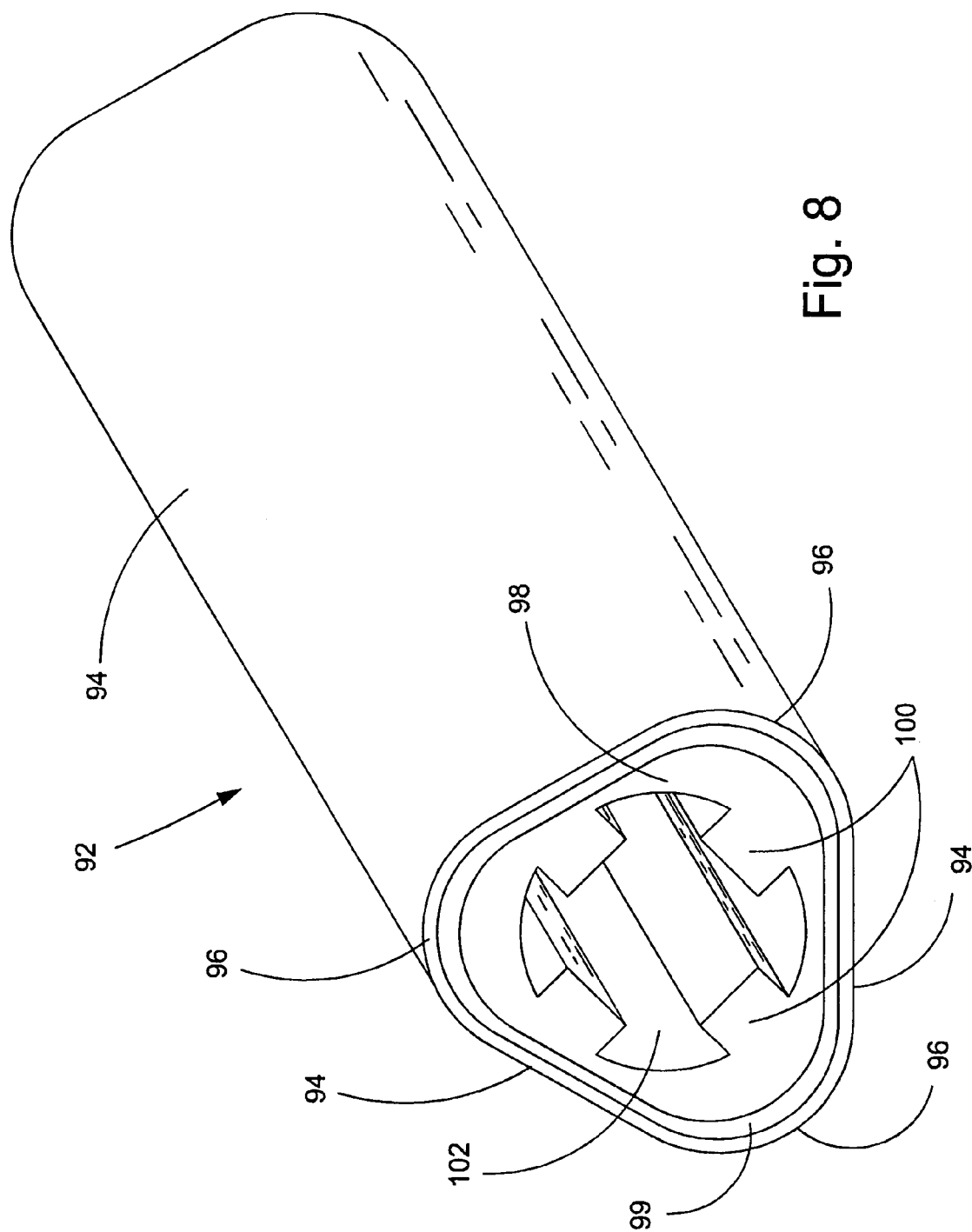
FIG. 8 is an isometric view of still a further alternative embodiment of the supported tubular SOFC of the invention, wherein instead of being cylindrically shaped the exterior cathode comprises three surfaces with rounded vertices and an interior supportive anode ring with symmetrically configured, spaced elevations protruding into the interior bore of the cell.
Figure 9:
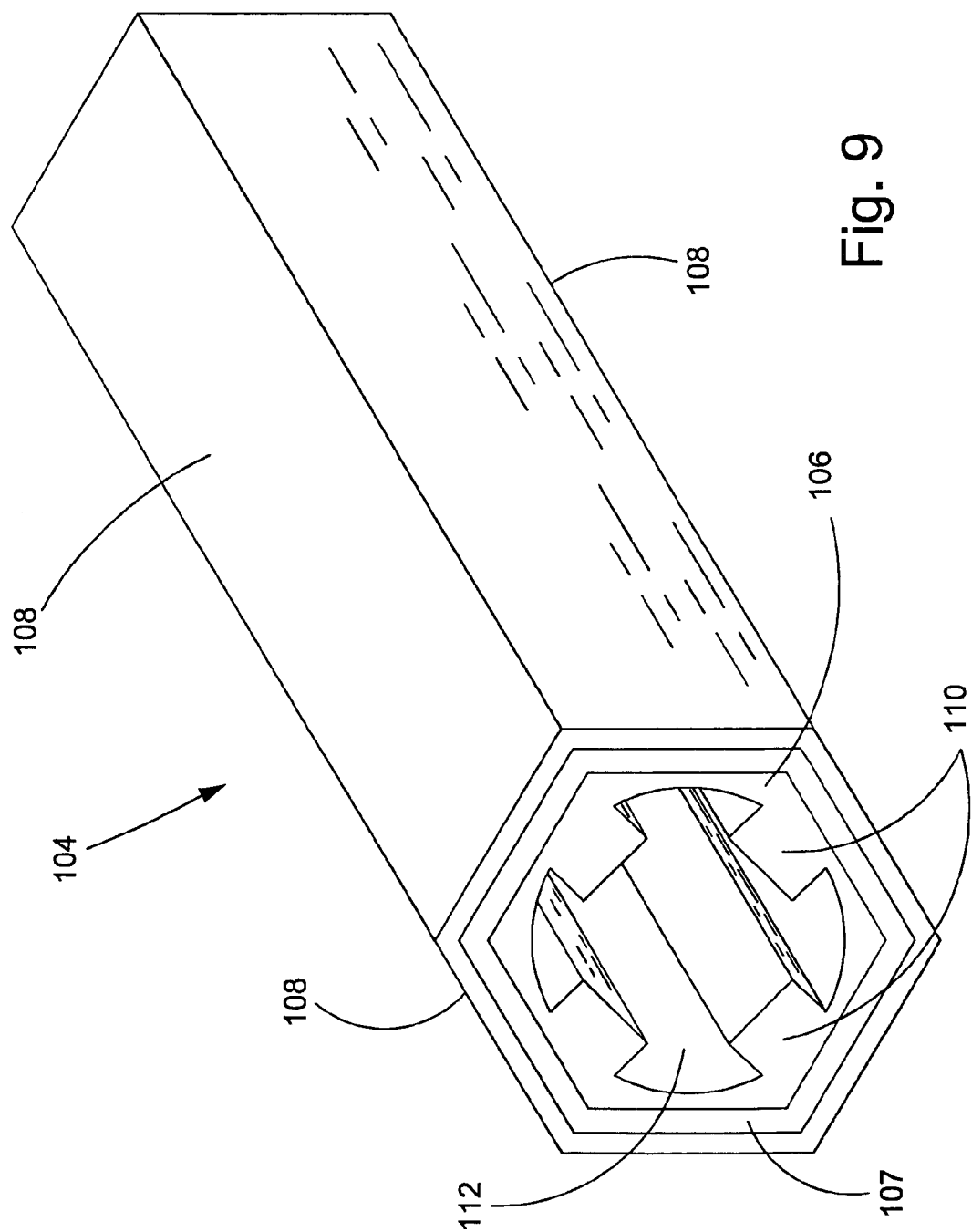
FIG. 9 is an isometric view of polygonal shaped SOFC, and more specifically, a fuel cell wherein the outer cathodic ring is hexagonally shaped and reinforced with an interior anodic ring featuring a multiplicity of rectangularly spaced elevations protruding off the interior surface of the anode into the bore of the cell.
Figure 11:
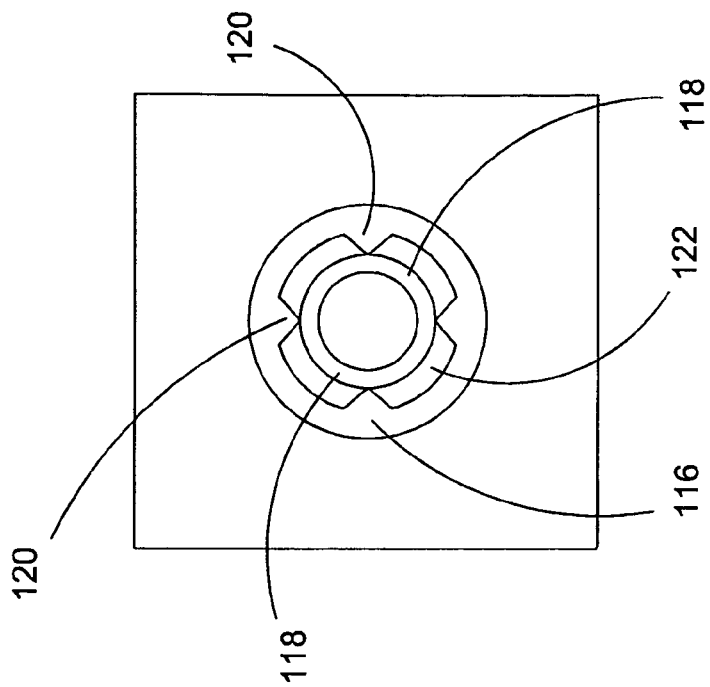
FIG. 11 is a top plan view of the tubular SOFC mounted onto a fuel injector according to FIG. 10.

FIGS. 8 and 9 illustrate alternative tubular embodiments of the invention wherein the tubular structures are not rounded, e.g., cylindrical shaped tubes, but can be polygonal, for instance. FIG. 8 illustrates one embodiment of such SOFC of the invention 92 comprising three main outer cathodic surfaces 94 which together are triangular-like except for rounded vertices 96 joining surfaces 94. The invention, of course, contemplates polygonal structures having three or more surfaces, e.g., triangular, squares, pentagonal, hexagonal, and so on. The tubular fuel cell embodiments, like those of FIG. 8 comprise the supporting anodes, as described herein. The fuel cell of FIG. 8 also comprises inner supporting anode 98, intermediate electrolyte 99 and outer three-sided cathode structure 94. The supporting anode 98 also comprises elevations 100 as protrusions into the inner bore of the cell, such as previously described between intermediate rounded areas 102.

Still FIG. 9 includes polygonal SOFC 104 of the invention, wherein the cell comprises an inner supporting anode ring 106 and intermediate tubular electrolyte ring 107 and polygonal shaped outer cathode having six surfaces 108. This embodiment features supporting anode ring 106 having a multiplicity of bosses 110 as spaced elevations positioned between rounded depressions or arcs 112.

The specific embodiments of FIGS. 1–9 are intended to be for illustrative purposes only, and not intended to be limiting to the various alternative embodiments which would be apparent to persons of ordinary skill in this art, but are intended to include all such alternatives and variations.

As previously mentioned, a principal aspect of the invention is the anode having novel internal geometries with enhanced supportive properties, particularly for use in tubular SOFCs, providing structural reinforcement to the entire fuel cell over conventional tubular anodes.

Use of the improved anode as a supporting structure is most beneficial from the standpoint of performance, (see U.S. Pat. No. 6,436,565 to Song, et al). In addition, high current densities can be achieved with the fuel cells equipped with the anodes of the present invention, as previously discussed, with inner ring thicknesses on the order of 0.2 to 2.0 mm through increased electronic conductivity and reduction of activation overpotentials (referring to voltage losses due to electrochemical charge transfer reactions).

Compositionally, the content of electrochemically active substance, i.e., metal, used in the anode, cermet support is preferably in the range from about 30.0 to about 80.0 vol. %, based on the volume of the solids. With a metal content below 30 vol. %, the metal-ceramic anode composite has diminished electrical conductivity. When the metal content of the supporting anode cermet is about 30 vol. % or above, good interfacial bonding is brought about among the metal particles, resulting in increased electronic conductivity. Metal contents up to 80 vol. % are adequate to ensure very high electronic conductivity whilst maintaining sufficient porosity to minimize concentration polarization. Higher amounts of metal in the anode cermet can result in a large thermal expansion coefficient mismatch with the subsequently coated electrolyte, resulting in crack formation during processing or cell operation.

To enhance cell performance, it is also desirable to increase the porosity of the anode, so that concentration polarization (referring to voltage losses associated with resistance to gas flow through porous electrodes) is kept to a minimum level. One method for achieving this result provides for the reduction of metal oxide powders into elemental metals under reducing atmospheric conditions providing greater porosity in the anode substrate by an essentially in-situ process. Thus, higher contents of metal oxide in the anode composition are generally preferred.

Additional porosity to the anodes can also be created via the introduction of pore formers. Representative examples of useful pore formers include carbon powder, starch, polymer beads, and so on. Pore formers are subsequently removed during sintering when the supportive anodes are fabricated into a complete tubular SOFC structure. Pore-forming agents are preferably employed in amounts up to 50 vol %, based on the metal ceramic powder. Significantly higher levels of added pore former can lead to a loss in mechanical strength.

Representative examples of useful ceramic materials for the cermet fuel anode support of this invention include stabilized-zirconia for high-temperature SOFC (700° C. to 1000° C.). This includes preferably 8 mol % yttria-stabilized zirconia (YSZ), $(ZrO_2)_{0.92}(Y_2O_3)_{0.08}$. Another useful material is doped-ceria, used for intermediate temperature SOFC (500° C. to 700° C.). This includes preferably gadolinium-doped ceria (CGO), $(Ce_{0.90}Gd_{0.10})O_{1.95}$. Other materials suitable for SOFC electrolyte applications are applicable to this invention.

Generally, the metal phase used in the fuel electrode supports of this invention and the cermet electrolyte belong to the transition metals group of the Periodic Table of elements, and includes their alloys or physical mixtures. Elemental nickel (Ni) is a preferred specie because of its high electrochemical activity, high electronic conductivity under reducing atmospheric conditions, and also for its cost effectiveness. Metal may be introduced in the anode support and cermet electrolyte via different precursors, including metal powders, metal oxide powders, metal salts (aqueous or non-aqueous), and the like. Metal oxide powders, such as NiO, are often preferred because of their cost effectiveness and their adaptability to ceramic processing. A limited amount of very fine metal particles can be introduced via metal salts, such as $Ni(NO_3)_2$ dissolved in aqueous and non-aqueous solvents, including water or solutions of alcohol. This is particularly relevant to the anode support where intimate contact between metal particles is desired for enhanced electronic conductivity.

The protruding longitudinal bosses of the anode support allow for the overall thickness of the anode to be reduced, as they increase both the strength of the anode and the surface area within the anode that is in contact with the gas stream. Therefore, the modified supporting anodes possess enhanced structural properties compared with conventional tubes lacking such structural features. Preferably, the internal elevations are positioned symmetrically so they and their intermediate grooves are spaced equidistant from one another. This also imparts even weight distribution to the tubular support. This structural property is also desirable for minimizing differential shrinkage during drying and sintering during cell fabrication. An uneven distribution of grooves across the bare tubular support may lead to detrimental defects, such as warping and/or cracking. The strength of the support tube may increase with the number of protruding bosses.

The presence of protruding bosses also enhances the electrochemical performance of the supporting anode. Higher current densities are achieved through increased electronic conductivity and reduction of activation overpotentials across the thicker sections of the cermet anode.

Figure 10:
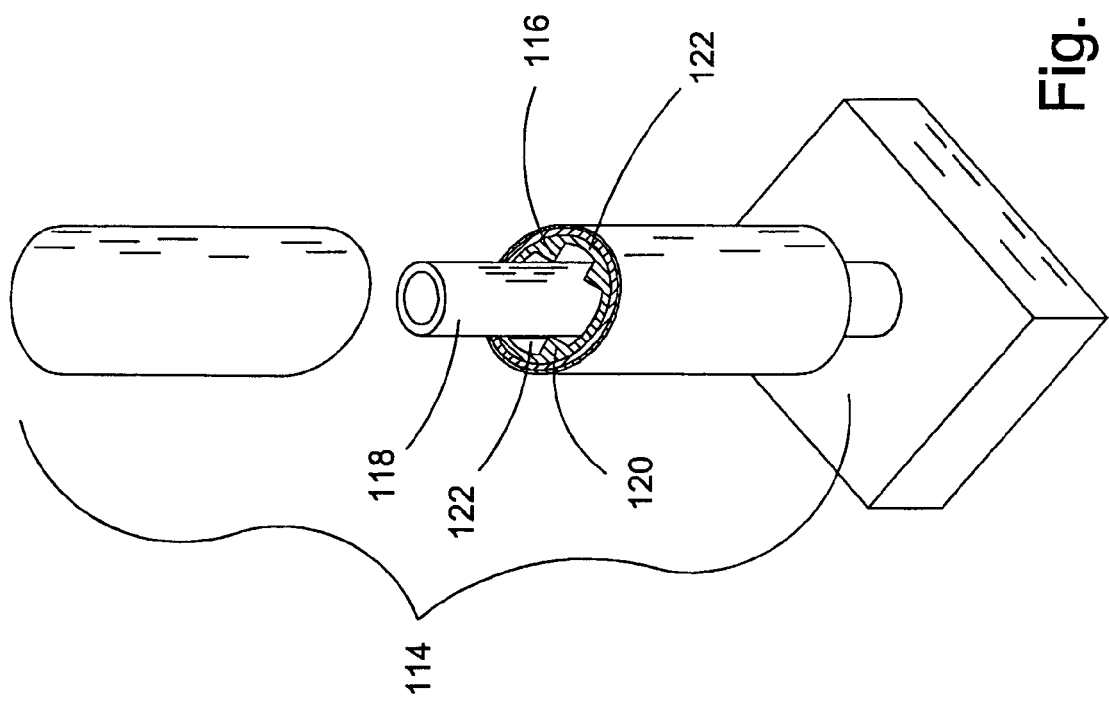
FIG. 10 is an exploded view illustrating a tubular SOFC of the invention fabricated with a supporting anode mounted onto a fuel injector.

As previously mentioned, the longitudinal protruding bosses also provide superior mounting capability of the cell into a fuel cell stack assembly. FIG. 10 illustrates a partially exploded view of a tubular SOFC 114 comprising anode support 116 of the present invention mounted onto a fuel injector 118, whereby the anode ridges or elevations 120 are used to position and secure the injector 118 in a predetermined orientation within the tubular bore of the cell. Elevations 120 between rounded voids 122 physically maintain the central positioning of the fuel injector 118 optimizing the flow characteristics inside the anode support, thus leading to a better distribution of fuel to the anode reaction sites.

Processing routes for manufacturing the ridged anode supports rely on preparing a fuel electrode mixture comprising the metal and ceramic compounds discussed supra. Aqueous or non-aqueous media may be used to suspend the particulates. However, aqueous media are often preferred because of their cost effectiveness and fewer environmental issues related to flammability and toxicity of organic solvents. Common processing additives (dispersants, binders, plasticizers) are also used to ensure a well-dispersed, homogeneous and stable mixture (see R. J. Pugh et al., "Surface and Colloid Chemistry in Advanced Ceramics Processing", Marcel Dekker, October 1993). The characteristics of these mixtures, such as viscosity, can be altered by changing the properties or the amounts of the different raw materials. They are then adapted to specific molding procedures.

Figure 12:
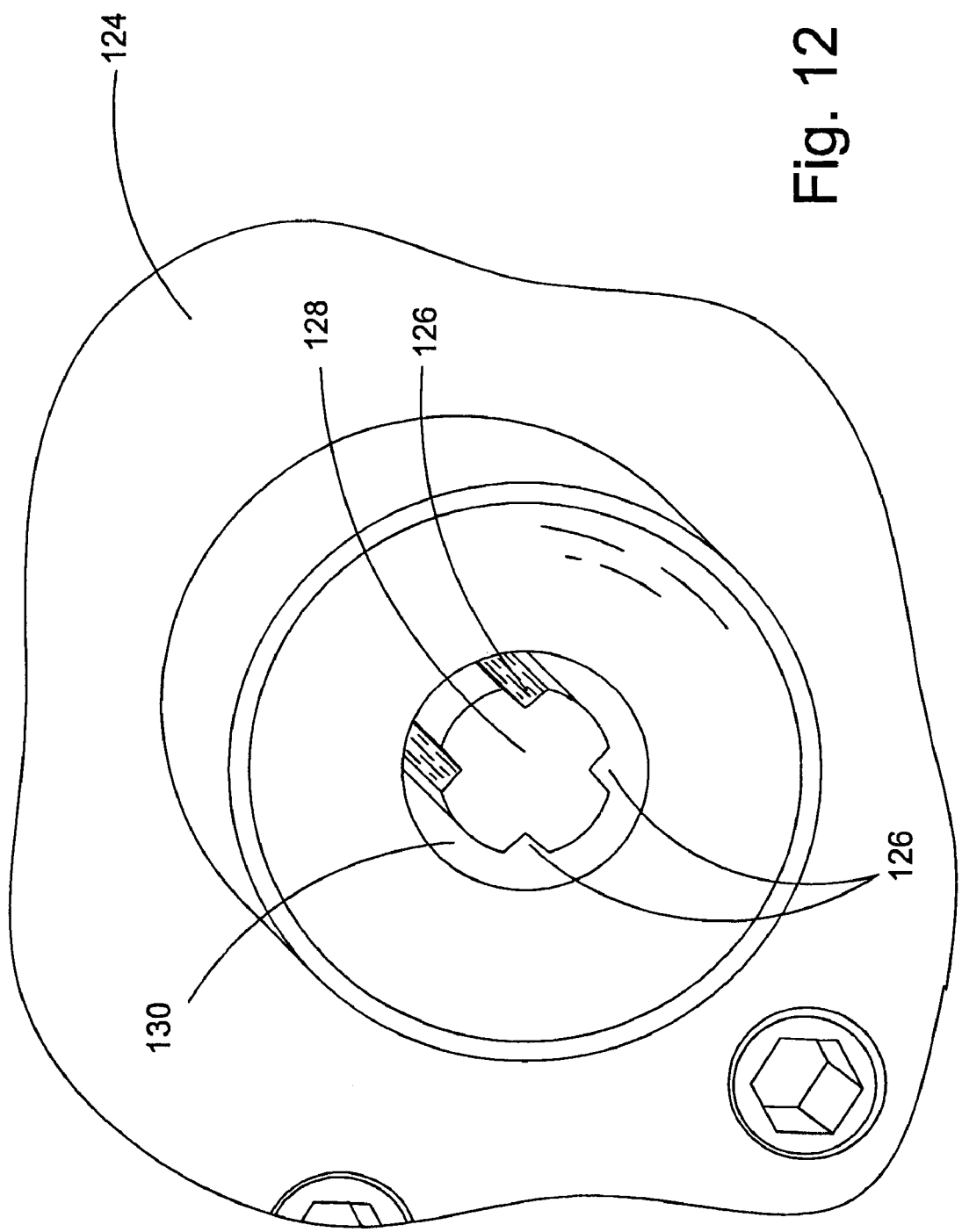
FIG. 12 is a partial end view of an extrusion die used to shape the tubular supporting anodes of the invention with anodic bosses protruding from the internal ring.

In particular, extrusion of aqueous plastic-like masses is preferred in manufacturing shapes of cross-sectional uniformity. This is particularly relevant when full-length continuous bosses along the support tube are desired. FIG. 12 illustrates a partial view of an extrusion die 124 wherein grooves 126 have been machined into the inner die 128 off the die slot 130. Thus, the extrudate exhibits protruding ridges along the internal wall of the tubular supporting anode coinciding with those of FIG. 1, and so forth.

On the other hand, more complex shapes, for example, where the bosses follow a spiral (helical) route can be prepared through casting techniques (liquid processing) or pressing techniques (dry processing). Casting techniques include slip-casting, centrifugal casting, gel-casting, and the like. Pressing techniques include dry pressing and isostatic pressing. All such processing routes are known and well documented in the literature (see for example J. S. Reed, "Principles of Ceramic Processing, $2^{nd}$ Edition", J. Wiley & Sons, November 1994).

As mentioned above, other additives may be introduced into the composition, such as pore formers, in order to tailor the porosity of the fuel electrode support. These optional additives are incorporated in the cermet mixture before the molding operation.

The novel supporting anodes of the invention can be employed in anode-supported solid oxide fuel cells typically with application of an intermediate solid electrolyte and outer air electrode (cathode). Fuel electrode-supported types (i.e., anode supported), wherein the electrolyte layer underlying the air electrode coated as a thin film onto a cermet anode support are well known in the art. The selection of electrolyte materials and air electrode (cathode) materials can include a wide range depending on the temperature the fuel cell is intended to operate.

For example, if the anode supported SOFC will be operating at elevated temperatures in a range from 700° C. to 1000° C., then the electrolyte may be selected from a stabilized zirconia, such as $(ZrO_2)_{0.92}(Y_2O_3)_{0.08}$ (YSZ), whereas if operated at intermediate temperatures from 500° to 700° C. then the electrolyte may be a doped ceria, such as $(Ce_{0.90}Gd_{0.10})_{1.95}$.

One method of fabrication using conventional powders to produce an anode supported SOFC may include the following steps of:

Blending an electrolyte substance (YSZ) with an electrochemically active substance, such as nickel to form a fuel electrode. The volume % of the electrochemically active material may range from about 30 to about 80%, with about 40 to about 60% being preferred.

The following example is presented for the purpose of description and illustration. This is not to be considered to be limiting in any way.

EXAMPLE

A tubular SOFC with internally grooved supporting anode may be fabricated by the following steps:

A green oxide NiO powder is mixed with a YSZ powder, so that the amount of Ni (following reduction of NiO) introduced in the mixture is in the range 30 to 80 vol %. The paste composition further includes distilled water (solvent), methylcellulose or hydroxypropyl methylcellulose (binder), and glycerol or polyethylene glycol (plasticizer). Appropriate paste compositions may include from 70 to about 90 wt % solids loading (NiO+YSZ); from 5 to 25 wt % water; 1 to 15 wt % binder; and from 0.1 to 5 wt % plasticizer. The composition is then mixed under conditions of high shear using a high-shear mixer, such as a sigma-blade mixer, so that a homogeneous plastic mass is formed.

Optional additives include pore formers (e.g. carbon powder, starch, polymer beads), as previously described.

The anode support tube may then be extruded by forcing the paste through a die 124 (FIG. 12) at elevated pressure (e.g., 1 to 30 kN). The shape of the die determines the cross-sectional geometry of the extruded tubes. FIG. 12 illustrates a suitable die design with die slot 130 and ridges 126 machined to create the desired supporting internal geometry, e.g., elevations, etc.

Extruded tubes may be dried in ambient air over a period of several hours. Shorter drying times are achieved by using a temperature/humidity chamber where the humidity is controlled. The humidity is gradually decreased from high initial settings (90 to 100% RH), until the tube is fully dried.

An electrolyte ink or slurry with a suitable solids loading (from about 20 to 60 wt %) and particle size (D50 <1 micron) is then used to form the electrolyte layer on the dried support structure. The electrolyte (YSZ) is applied to the dried tube via either by dip coating where the dipping time and ink viscosity determine the final electrolyte thickness, or via spray process where rotation speed, X/Y placement, spray distance and other parameters can also be used to control the thickness of the electrolyte layer. Ideally, an electrolyte coating thickness from 5–50 microns should be used to achieve a dense electrolyte layer without cracking after the sintering process. The support and the electrolyte coating are then sintered at high temperature from 1300'–1450° C., the temperature being dependant on the particle size and solids loading of the original electrolyte slurry.

The co-fired anode support and electrolyte structure is then ready for the application of the cathode. The cathode is constructed of 2–4 layers with the first layer, the layer in direct contact with the electrolyte containing a higher volume % of YSZ compared to the external layer, thus creating a graded cathode structure. The cathode inks are prepared with a suitable solids loading (from 20 to about 60%) and particle size (D50=<2 microns) and the correct volume percentage of either YSZ or perovskite material (commonly LSM of various doping levels), to achieve the desired composition for that distinct layer. The cathode can be applied by a variety of application techniques including dip coating, spraying and screen printing, with spraying being preferred. The entire structure is then sintered at a lower temperature from 1000° to about 1250° C., to create the correct interface characteristics and electrode structure for the cathode electrode. The thickness of the cathode in a sintered state may range from about 0.2 mm to about 2.0 mm.

Although the invention has been described in detail for the purpose of illustration, it is understood that such detail is solely for that purpose, and variations can be made therein by those skilled in the art without departing from the spirit and scope of the invention which is defined in the claims.

We claim:

1. A solid oxide fuel cell, which comprises a monotubular body having an interior wall as a supporting anode, said supporting anode defining a hollow central bore of said fuel cell, and comprises at least one solid supporting means protruding from said interior wall into said hollow central bore of said monotubular body structurally reinforcing said fuel cell.

2. The solid oxide fuel cell according to claim 1, wherein said supporting means are integral with said anode and comprise a plurality of elevations or bosses.

3. The solid oxide fuel cell according to claim 2, wherein said elevations or bosses run substantially the entire length of said central bore of said tubular body.

4. The solid oxide fuel cell according to claim 2, wherein the said elevations or bosses are shorter in length than said central bore of said tubular body.

5. The solid oxide fuel cell according to claim 2, wherein the protruding elevations or bosses are positioned symmetrically relative to one another within said central bore.

6. The solid oxide fuel cell according to claim 2, wherein said elevations or bosses are generally square or rectangular shape.

7. The solid oxide fuel cell according to claim 1, wherein said tubular body further comprises an electrolyte layer and a cathode layer in combination with said supporting anode.

8. The solid oxide fuel cell according to claim 7, wherein said tubular body is cylindrical or polygonal.

9. The solid oxide fuel cell according to claim 8, wherein said tubular body is polygonal and comprises at least three sides.

10. The solid oxide fuel cell according to claim 9, wherein said tubular body is hexagonal.

11. The solid oxide fuel cell according to claim 9, wherein said tubular body comprises three sides joined at vertices which are rounded.

12. The solid oxide fuel cell according to claim 7, wherein the thickness of the cathode in a sintered state ranges from about 0.2 mm to about 2.0 mm.

13. The solid oxide fuel cell according to claim 1, wherein said tubular body is open at both ends or closed at one end.

14. The solid oxide fuel cell according to claim 1, wherein said supporting means protruding into said central bore of said tubular body comprises the same material of construction as that of the interior wall.

15. The solid oxide fuel cell according to claim 14, wherein said material of construction of said anode and said supporting means comprises a cermet.

16. The solid oxide fuel cell according to claim 15, wherein said cermet comprises a stabilized-zirconia or a doped ceria.

17. The solid oxide fuel cell according to claim 16, wherein the stabilized zirconia is a material comprising $(ZrO_2)_{0.92}(Y_2O_3)_{0.08}$.

18. The solid oxide fuel cell according to claim 16, wherein the doped ceria is a material comprising $(Ce_{0.90}Gd_{0.10})O_{1.95}$.

19. The solid oxide fuel cell according to claim 15, wherein the metal phase of the cermet is from the transition metals group of the Periodic Table of elements in a state selected from the group consisting of elemental metals, alloys and mixtures thereof.

20. The solid oxide fuel cell according to claim 19, wherein said transition metal is nickel.

21. The solid oxide fuel cell according to claim 19, wherein the content of the metal phase of the cermet ranges from about 30 vol % to about 80 vol %.

22. The solid oxide fuel cell according to claim 1, wherein the thickness of the supporting means protruding into said central bore in a sintered state ranges from about 0.1 mm to about 2.0 mm.

23. A solid oxide fuel cell, which comprises a tubular body having an interior wall as a supporting anode, said supporting anode defining a central bore of said fuel cell, and comprises a plurality of elevations or bosses protruding into said central bore from said interior wall, said elevations or bosses having a general helical pattern along the length of said central bore.

24. A solid oxide fuel cell, which comprises a tubular body having an interior wall as a supporting anode, said supporting anode defining a central bore of said fuel cell, and comprises a plurality of elevations or bosses protruding into said central bore from said interior wall, said elevations or bosses generally conically shaped.

25. A solid oxide fuel cell, which comprises a tubular body having an interior wall as a supporting anode, said supporting anode defining a central bore of said fuel cell, and comprises a plurality of elevations or bosses protruding into said central bore from said interior wall, said elevations or bosses having a generally rounded shape.

26. A method for manufacturing a solid oxide fuel cell comprising at least a supporting anode by the steps which comprise:
  (i) blending a ceramic electrolyte material with an electrochemically active transition metal or transition metal oxide to form a fuel electrode mixture;
  (ii) molding said fuel electrode mixture into a tubular fuel electrode having a central bore with at least one longitudinal elevation or boss protruding inwardly into said central bore, and
  (iii) drying said tubular fuel electrode.

27. The method according to claim 26, wherein the ceramic electrolyte material is a ceramic powder selected from the group consisting of stabilized-zirconia and doped-ceria.

28. The method according to claim 26, wherein the electrochemically active transition metal incorporated in said fuel electrode mixture is a metal oxide powder.

29. The method according to claim 26, wherein said transition metal is at least partially incorporated in said fuel electrode mixture by employing metal compounds pre-dissolved in aqueous or non-aqueous solvents.

30. The method according to claim 26, including the step of introducing a pore former into said fuel electrode mixture.

31. The method according to claim 26, wherein said fuel electrode mixture is a plastic mass suitable for extrusion molding.

32. The method according to claim 26, wherein said fuel electrode mixture is an aqueous or non-aqueous slurry suitable for molding by casting.

33. The method according to claim 26, wherein said fuel electrode mixture is a dry blend molded by a pressing method.

34. The method according to claim 26, comprising the further steps of:
  (iv) applying an electrolyte layer to said dried tubular fuel electrode;
  (v) sintering the fuel electrode-electrolyte structure of step (iv);
  (vi) applying at least one cathode layer to the sintered fuel electrode-electrolyte structure of step (v), and
  (vii) sintering the fuel electrode-electrolyte-cathode structure to form tubular solid oxide fuel cell.

35. A supporting anode for a solid oxide fuel cell comprising a monotubular body having an interior wall defining a hollow central bore, said interior wall comprising at least one solid supporting means protruding into said hollow central bore for structurally reinforcing said anode.

36. The supporting anode according to claim 35, wherein said supporting means are integral with said anode and comprises a plurality of elevations or bosses.

* * * * *